US009363948B2

(12) United States Patent
Birkland

(10) Patent No.: US 9,363,948 B2
(45) Date of Patent: Jun. 14, 2016

(54) LANDSCAPE BORDER FRAMING UNIT AND METHOD

(71) Applicant: Gordon W. Birkland, Snohomish, WA (US)

(72) Inventor: Gordon W. Birkland, Snohomish, WA (US)

( * ) Notice: Subject to any disclaimer, the term of this patent is extended or adjusted under 35 U.S.C. 154(b) by 0 days.

(21) Appl. No.: 14/639,380

(22) Filed: Mar. 5, 2015

(65) Prior Publication Data

US 2015/0250104 A1     Sep. 10, 2015

Related U.S. Application Data

(60) Provisional application No. 61/967,021, filed on Mar. 8, 2014.

(51) Int. Cl.
*A01G 1/08*          (2006.01)

(52) U.S. Cl.
CPC ........................................ *A01G 1/08* (2013.01)

(58) Field of Classification Search
CPC ...... A01G 1/08; E04H 17/16; E04H 17/1421; E04H 17/1417; E04H 17/1443; E04H 2017/1465; E04G 13/00; E04G 17/14
USPC ................ 52/102, 169.2, 169.3, 169.12, 474, 52/475.1, 476, 479, 481.1, 772, 780, 300, 52/745.05, 741.13; 47/33; 256/19, 24; 405/285, 286, 284
See application file for complete search history.

(56) References Cited

U.S. PATENT DOCUMENTS

| | | | |
|---|---|---|---|
| 2,244,042 A * | 6/1941 | Barlow | ..................... A47G 5/04 16/250 |
| 2,545,717 A | 3/1951 | Voigt | |
| 2,919,045 A | 12/1955 | Waught et al. | |
| 3,171,223 A | 3/1965 | Josephson | |
| 3,395,489 A * | 8/1968 | Banse | ................. E04H 17/1421 256/24 |
| 3,447,824 A | 6/1969 | Brown | |
| 3,451,183 A | 6/1969 | Lespagnol et al. | |
| 4,034,463 A | 7/1977 | Ryan | |
| 4,429,489 A | 2/1984 | Fischer | |
| 4,898,309 A | 2/1990 | Fisher | |
| 4,955,499 A | 9/1990 | Petty | |

(Continued)

OTHER PUBLICATIONS www.frameitall.com, (Feb. 2005).

*Primary Examiner* — Basil Katcheves
*Assistant Examiner* — Theodore Adamos
(74) *Attorney, Agent, or Firm* — Dean A. Craine

(57) ABSTRACT

A framing unit used with a plurality of replaceable panels that form a vertical retaining wall or a rigid enclosure to make raised planting beds. The framing unit includes two vertical end connectors, two horizontal top rails, at least one bottom rail, and a plurality of vertical panels. Each end connector includes two side flanges joined to form a vertical channel. Each end connector includes at least one hinge sleeve offset from the hinge sleeve on the opposite end connector adjacent framing units to be joined with a single anchor pin. The bottom and the two top rails are parallel and extend between the two end connectors. The top rails are separated by an upper gap that allow a plurality of vertical panels to be inserted into and supported by a channel formed on the bottom rail. The top edges of the panels are captured by the two top rails.

11 Claims, 8 Drawing Sheets

(56) References Cited

U.S. PATENT DOCUMENTS

| | | | | |
|---|---|---|---|---|
| 5,291,708 A * | 3/1994 | Johnson | ............... | E02D 27/01 256/24 |
| D386,652 S * | 11/1997 | Rimback | ............... | D8/1 |
| 5,702,090 A * | 12/1997 | Edgman | ............... | E04H 17/1421 256/19 |
| 5,852,895 A * | 12/1998 | Sinanan | ............... | A01G 9/022 47/33 |
| 5,901,526 A * | 5/1999 | Vidmar | ............... | E04H 12/2215 256/19 |
| 5,938,184 A * | 8/1999 | DeSouza | ............... | E04H 17/1421 256/19 |
| 6,202,367 B1 * | 3/2001 | Marino | ............... | A01G 1/08 47/30 |
| 6,398,193 B1 * | 6/2002 | DeSouza | ............... | E04H 17/1421 256/19 |
| 7,640,695 B2 | 1/2010 | Bonohoom | | |
| 7,966,766 B2 | 6/2011 | Vogler et al. | | |
| 8,839,553 B2 | 9/2014 | Toro | | |
| 8,919,041 B2 * | 12/2014 | Topping | ............... | A01G 9/20 47/58.1 LS |
| 2001/0020351 A1 * | 9/2001 | Alvaro | ............... | E02D 27/02 52/481.1 |
| 2006/0118772 A1 * | 6/2006 | Rosine | ............... | E04H 17/16 256/24 |
| 2008/0296547 A1 * | 12/2008 | Renteria | ............... | E04H 17/1413 256/19 |
| 2010/0096608 A1 * | 4/2010 | McCarthy | ............... | E04H 17/1404 256/19 |
| 2010/0200825 A1 * | 8/2010 | Hill | ............... | E04H 17/16 256/24 |
| 2013/0320281 A1 * | 12/2013 | Richison | ............... | B23P 11/00 256/24 |
| 2014/0124722 A1 * | 5/2014 | Mann | ............... | E04H 17/165 256/21 |
| 2015/0041743 A1 * | 2/2015 | Richison | ............... | E04H 17/166 256/24 |

* cited by examiner

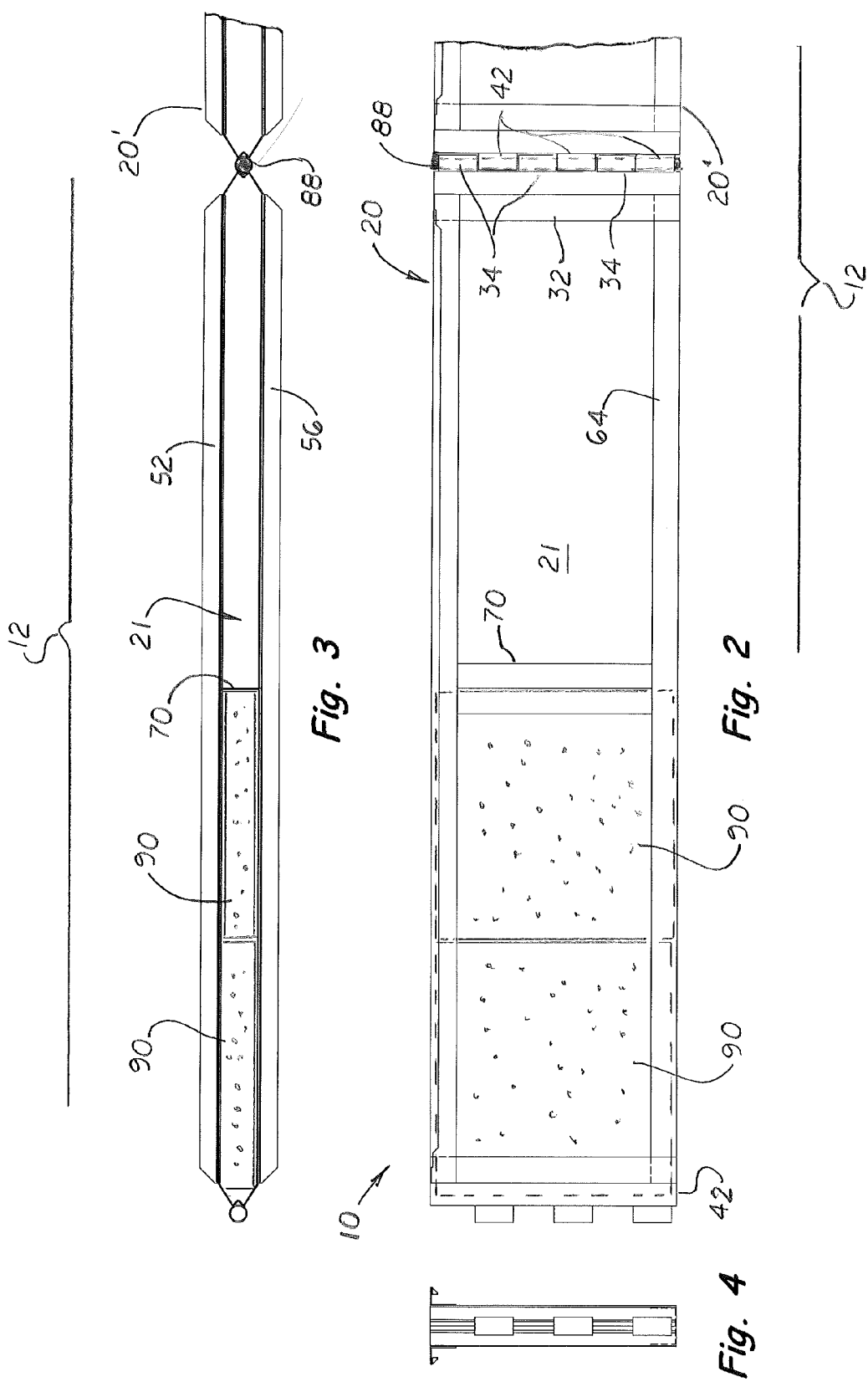

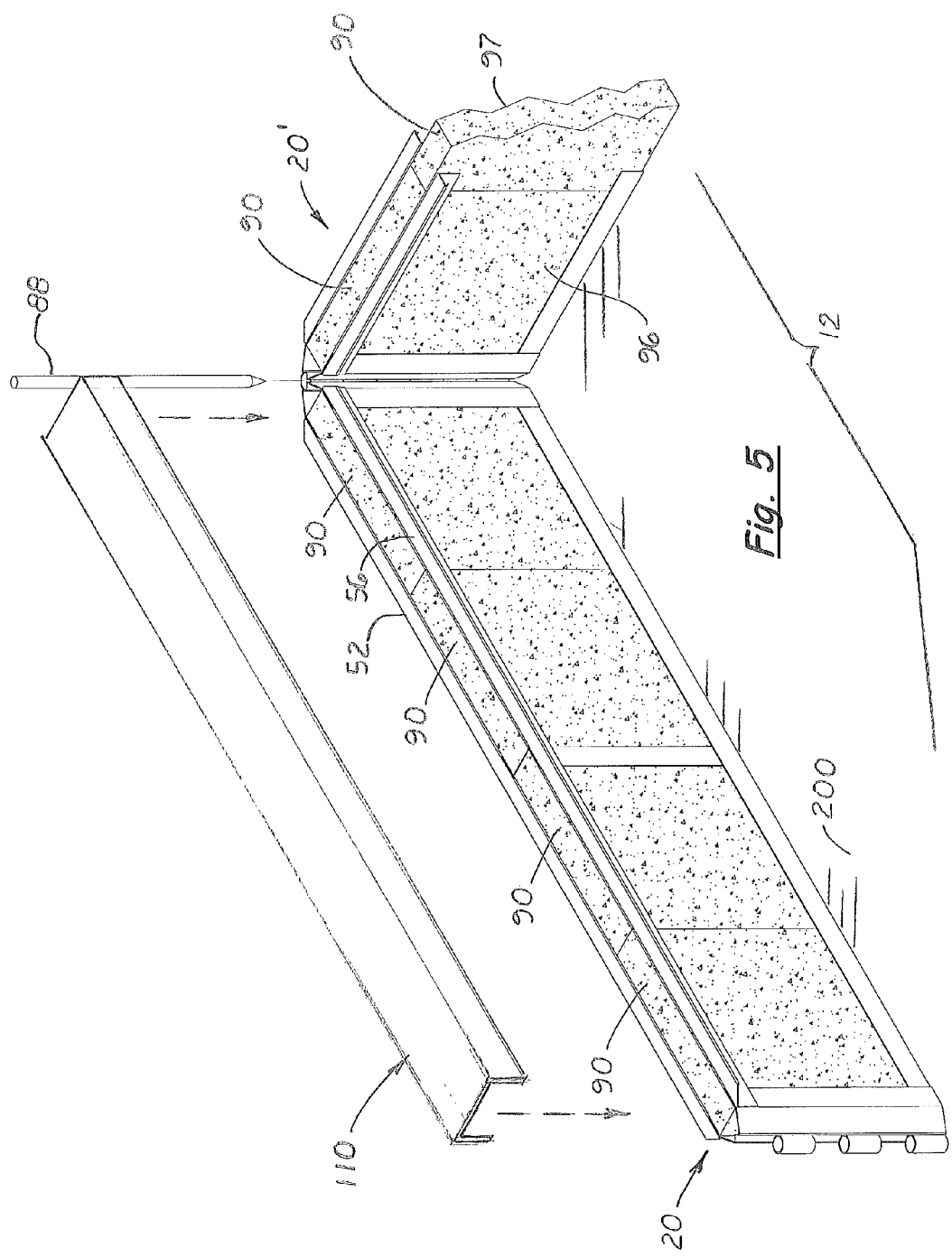

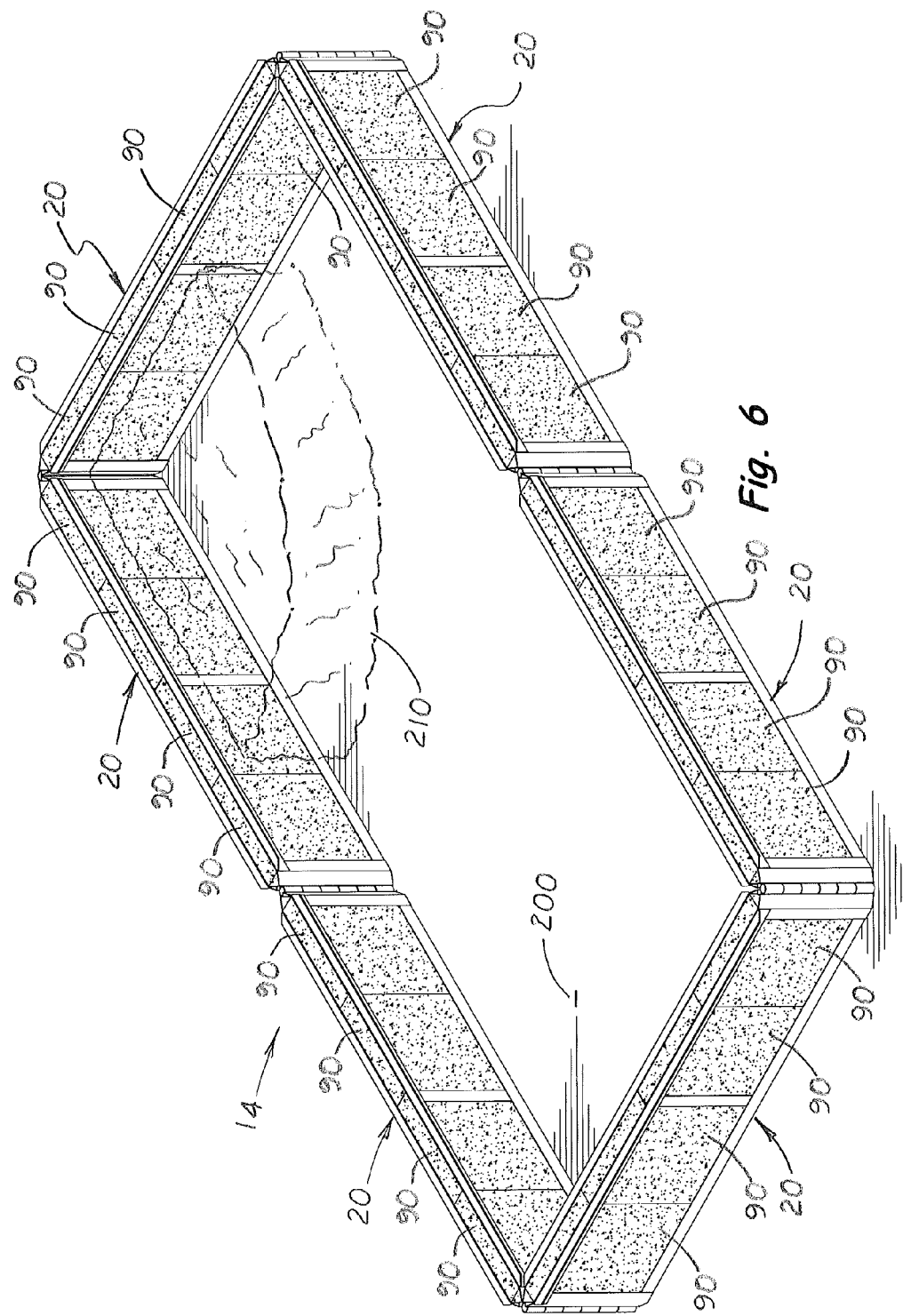

LANDSCAPE BORDER FRAMING UNIT AND METHOD

This utility patent application is based upon and claims the filing date benefit of U.S. provisional patent application (Application No. 61/967,021) filed on Mar. 8, 2014.

BACKGROUND OF THE INVENTION

1. Field of the Invention

This invention generally pertains to framing structures to make raised planting beds or landscape wall, and particularly to framing units used individually or jointly with other framing units designed to securely hold one or more vertical panels on edge to restrain soil on one side of the framing unit.

2. Description of the Related Art

Raised planting beds are commonly used by homeowners to grow vegetables, herbs and flowers. They typically include an outer rectangular structure with four vertical side walls made of two or more rows of (2×6) or (2×6) wood planks aligned horizontally and stacked vertically on edge. The side walls are typically 6 to 12 inches wide and 4 to 12 feet in length and connected at their ends to form a rigid enclosure that retains a large volume of top soil that fills the center area inside the rigid enclosure.

Although treated wood is recommended for outdoor use, it is not recommended for raised beds because the preservatives soaked into the wood leaches into the top soil and is eventually absorbed into the plants. Although non-treated wood may be used to construct the rigid enclosure, it too has drawbacks of excessive warping and deterioration that require the wood to be replaced every few years. While rocks, bricks, or concrete blocks may be alternative materials to form the outer boundary of a raised planting bed, they cannot be individually connected together and easily misaligned.

Homeowners also construct elevated growing areas adjacent to paths, sidewalks and patios. For example, edging material, two to six inches in height, is sometimes placed along the edge of the path, sidewalk and patio to delineate the edge or to keep soil inside an adjacent flower bed. Plastic and concrete edging and bricks are examples of edging material. Unfortunate, edging and bricks are relative thin or short and cannot be used to make tall wall segments often desirable around some areas.

What is needed is a durable, landscape border framing unit that is sufficiently rigid and lightweight and can be used with a plurality of long, vertically aligned, replaceable panels made of different materials that can be easily assembled to form either a raised planting bed or an elevated wall segment adjacent to a path, sidewalk or patio.

SUMMARY OF THE INVENTION

The above needs are met by a landscape border framing unit used with a plurality of replaceable panels inserted into a framing unit to form a vertical wall capable of retaining soil on one side. The framing units may be constructed in different lengths and sizes and may be used singularly or joined to an adjacent frame unit to construct an enclosure or a long wall segment.

The framing unit is made of light weight, weather resistant material designed to be in direct contact with soil. In one embodiment, the framing unit is made of galvanized sheet metal or aluminum and designed to extend vertically upward over the soil and holds a plurality of vertical aligned panels also made of weather resistant material, such as wood, concrete or plastic. The framing unit includes two end connectors with hinge sleeves that receive anchor pins which are embedded into the soil to vertically hold the framing unit upright. During assembly, one framing unit may be selected to form a short wall segment. Alternatively, two or more framing units may be connected together in an end to end manner to form a large wall segment, or to form a raised planting bed.

More specifically, the framing unit includes two vertically aligned end connectors, two horizontal aligned top rails, at least one horizontally aligned bottom rail, and at least one intermediate vertical support. Each end connector includes two vertical side flanges spaced apart and joined at one end to form a vertical channel. Formed or attached to the outside surface of each connector is at least one vertical hinge sleeve. The hinge sleeves on the opposite end connectors are offset from each other enabling the end connectors on adjacent framing units to be abutted with their hinge sleeves coaxially aligned. Anchor pins are inserted into the coaxially aligned hinge sleeves to connect the ends of the adjacent framing units together.

The bottom rail is a straight and elongated structure that extends between the lower ends of the two end connectors. In one embodiment, the bottom rail is U-shaped in cross-section and forms a continuous, upward extending lower channel.

The two top rails are straight, elongated, L-shaped bars that extend between the top ends of the two end connectors. The two top rails are parallel to the bottom rail and attached at their opposite ends to the two end connectors. A continuous uniform upper gap is formed between the two top rails approximately the same width as the lower channel formed on the bottom rail and the same width as the vertical channels formed on the two end connectors.

Extending between the two top rails and the bottom rail is at least one intermediate vertical support at or near the framing unit's mid-line axis that supports and keeps the two top rails and bottom rail parallel and evenly spaced apart the entire length of the framing unit.

The framing unit is designed to be used with a plurality of vertical panels that have a uniform thickness that allows them to slide into the upper gap formed between the two top rails. The lower edges of the vertical panels rest inside the lower channel formed on the bottom rail. The top edges terminate inside the upper gap or extend above the two top rails. The outside lateral edges on the two end vertical panels rest inside the two vertical channels formed on the two end connectors.

In one embodiment, the vertical panels are square or rectangular planar structures with straight flat bottom edges and perpendicularly aligned side edges. When placed into the frame unit, the vertical panels form a continuous vertical wall between the two end connectors. Also, the heights of the vertical panels must be sufficient to extend into the upper gap formed between the two top rails. In some instances, vertical panels may terminate at the two rails or may extend above the top rails. When the vertical panels terminate near or at the top edge of the top rails, an option cap rail may be attached over the two top rails to provide a decorative edge.

Using the above framing unit and vertical panels, a method for assembling a wall section or a raised planting bed is also disclosed.

BRIEF DESCRIPTION OF THE DRAWINGS

FIG. 2 is a side elevational view of a framing unit.

FIG. 3 is a top plan view of a framing unit with two vertical panels inserted at one end.

FIG. 4 is an end elevational view of the framing unit shown in FIG. 3

FIG. 5 is a perspective view of two framing units with vertical panels inserted into each framing unit and showing the two framing units being connected together at one end with an anchor pin and with their longitudinally axis being aligned approximately 90 degrees apart.

FIG. 6 is a perspective view of a four sided, rigid enclosure made of six framing units connected together and each filled with four vertical panels.

DESCRIPTION OF THE PREFERRED EMBODIMENT(S)

Figure 1:
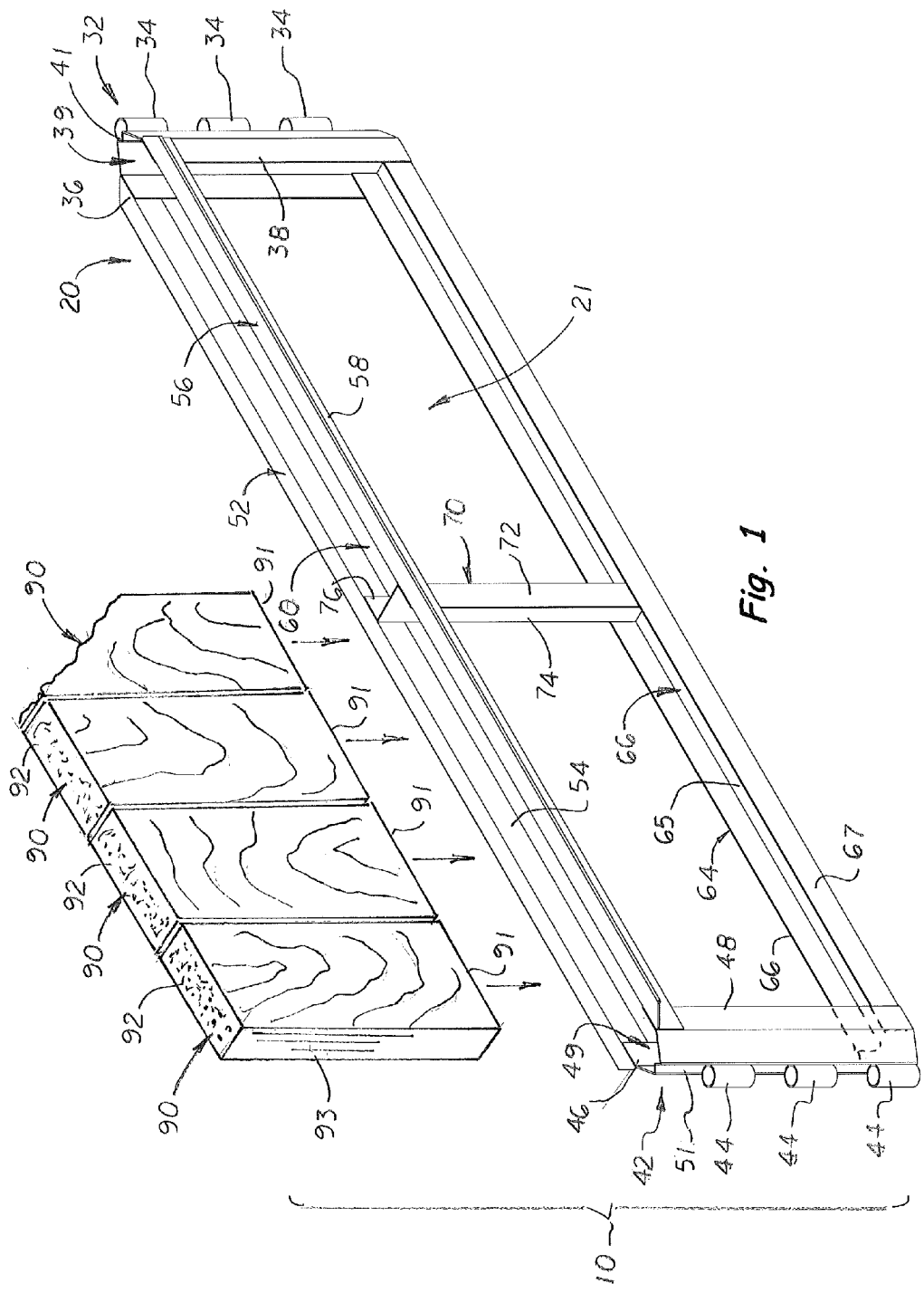
FIG. 1 is a perspective view of a framing unit.
Figure 7:
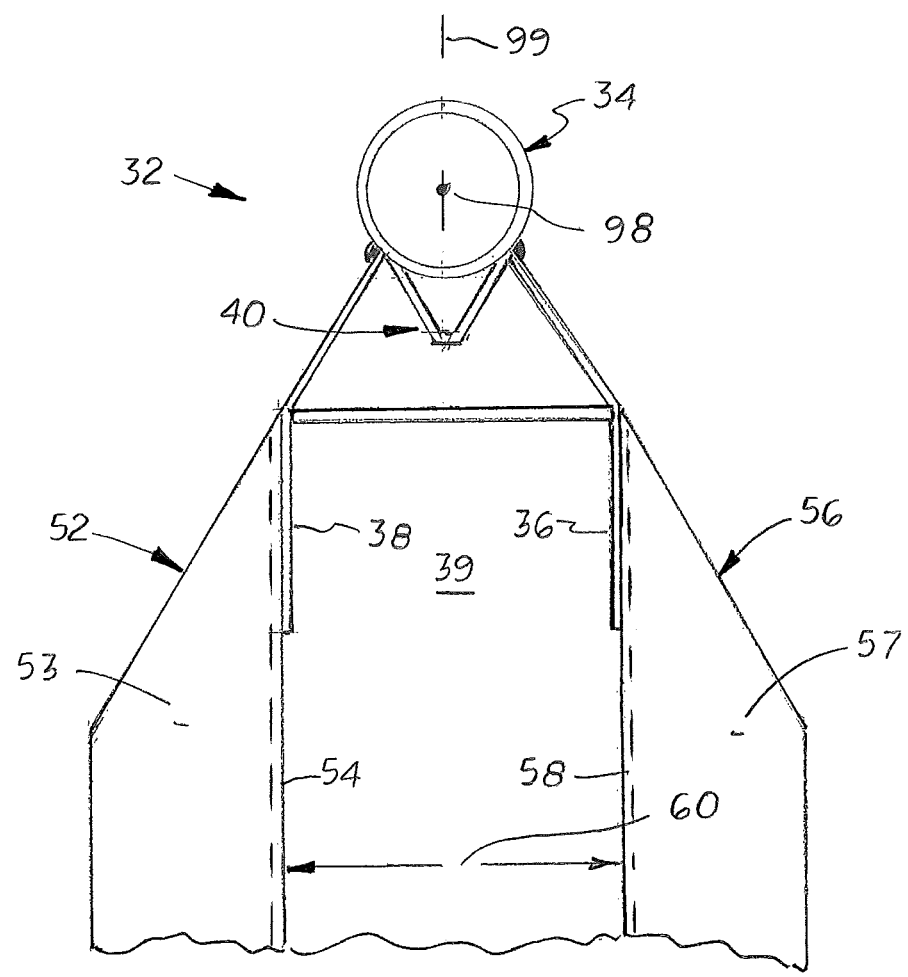
FIG. 7 is a top plan view the end of the end connector showing the hinge sleeve welded to the outside surface of the end connector.

Referring to the accompanying Figs, there is shown a landscape framing unit 20 used with a plurality of replaceable vertical panels 90 inserted into the center void area 21 formed in the framing unit 20. When assembled, the framing unit 20 and the vertical panels 90 together form a short vertical wall segment 10 shown FIGS. 1 and 2, a longer straight or angled wall segment 12 shown in FIG. 5, or a rigid enclosure 14 shown in FIG. 6 that may construct a raised planting bed.

The framing unit 20 is made of light weight, weather resistant material designed to be in direct contact with soil 200. More specifically, the framing unit 20 includes two vertically aligned end connectors 32, 42, two horizontal aligned top rails 52, 56, at least one horizontally aligned one bottom rail 64, and at least one intermediate vertical support 70 that extends between the two top rails 52, 56 and the bottom rail 64. Each end connector 32, 42 includes two vertical parallel side flanges 36, 38 and 46, 48, respectively, that are spaced apart and extend outward to form a vertical channel 39, 49, respectively. Formed centrally and extend outward on each end connector 32, 42 is a vertically aligned attachment site 40. In the first embodiment shown in FIGS. 1-7, the two side flanges 36, 38, 46, 48 converge inward and then outward to form a small 'w' shaped attachment site 40. Attached to the outside surface of the attachment site 40 and parallel to the end connector's longitudinal axis 97 is at least one longitudinally aligned hinge sleeve 34, 44, respectively.

Figure 10:
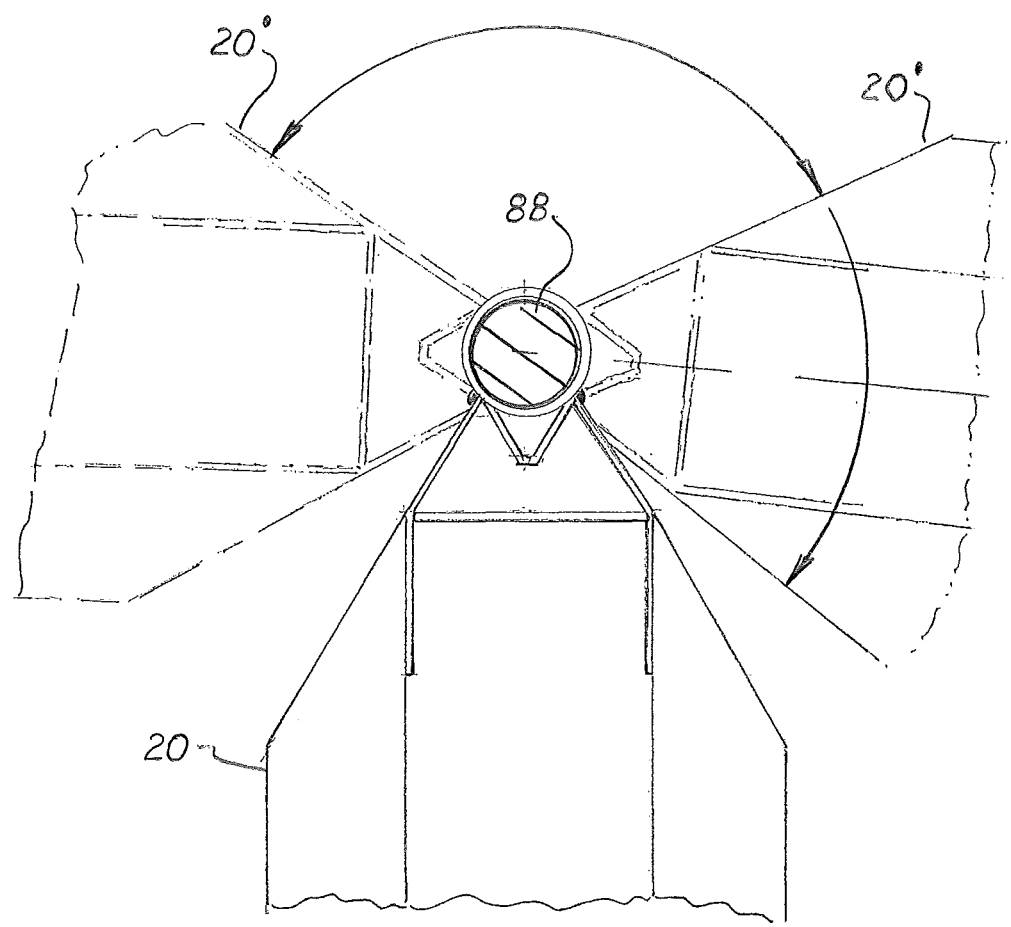
FIG. 10 is a top plan view showing a second framing unit connected to a first framing unit and may be rotated up to approximately 300 degrees around an anchor pin.

In the preferred embodiment, there are three hinge sleeves 34 and 44 on the opposite end connectors 32, 42. The hinge sleeves 34 are offset the hinge sleeves 44, on the opposite end connectors on adjacent framing units 20 to be abutted with their hinge sleeves 34, 44 coaxially aligned. Anchor pins 88 are inserted into the coaxially aligned hinge sleeves 34, 44 to connect the ends of the adjacent framing units 20, 20' together. Because the side flanges 36, 38 and 46, 48 converge towards the framing unit's midline axis 99, adjacent framing units 20, 20' connected together may rotate approximately 30 to 120 degrees apart as shown in FIGS. 5 and 10.

In the preferred embodiment, there are three hinge sleeves 34 and 44 on the opposite end connectors 32, 42. The hinge sleeves 34 are offset the hinge sleeves 44, on the opposite end connectors on adjacent framing units 20 to be abutted with their hinge sleeves 34, 44 coaxially aligned. Anchor pins 88 are inserted into the coaxially aligned hinge sleeves 34, 44 to connect the ends of the adjacent framing units 20, 20' together. Because the side flanges 36, 38 and 46, 48 converge towards the framing unit's midline axis 99, adjacent framing units 20, 20' connected together may rotate approximately 30 to 120 degrees apart as shown in FIGS. 5 and 10.

Figure 8:
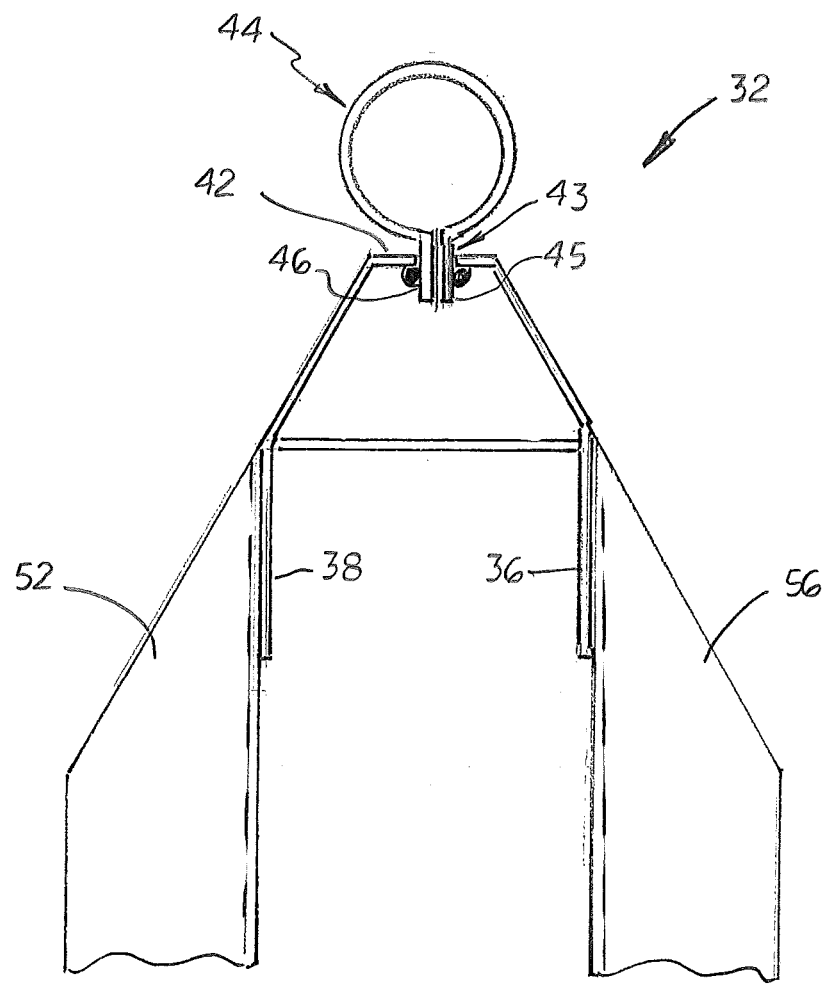
FIG. 8 is a top plan view of the end of an alternative end connector with a modified hinge sleeve with two extension tabs configured to fit into a slot formed on an attachment site on the end connector.
Figure 9:
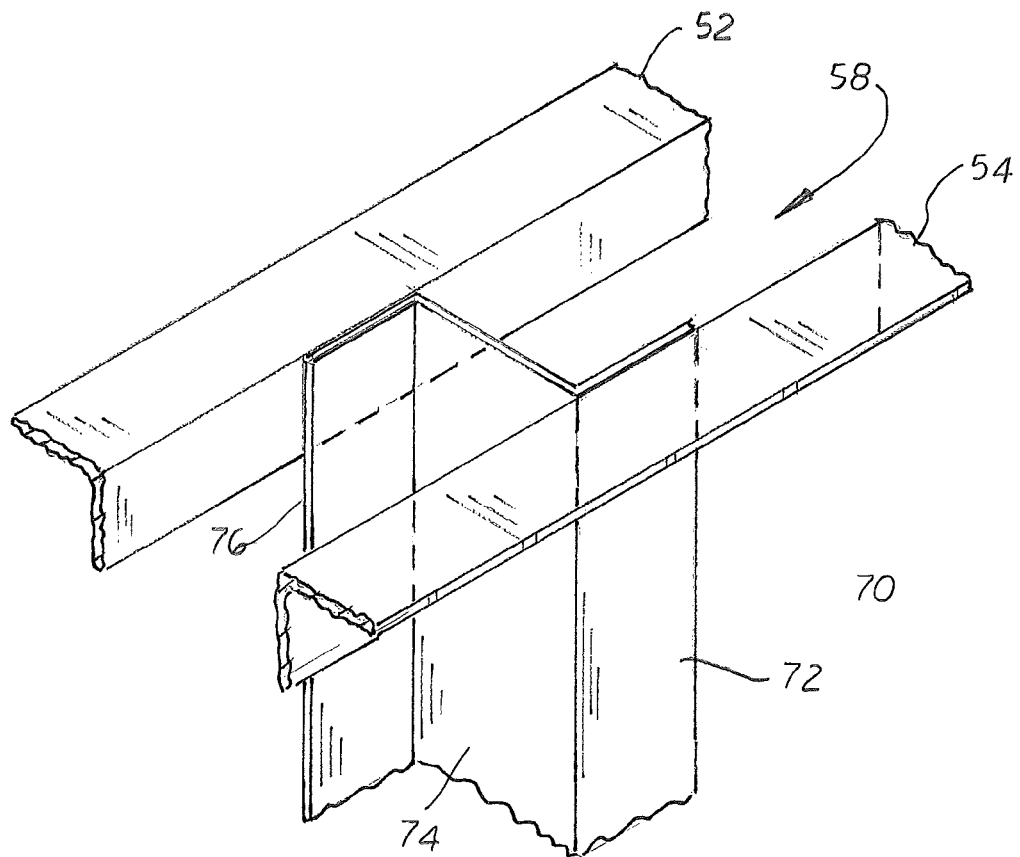
FIG. 9 is a perspective view an intermediate vertical support attached to the two top rails.

In a second embodiment, shown in FIG. 8, the 'w' shaped attachment sites 41, 51 may be replaced by a flat, vertical surface 42 formed by the two converging side flanges 36, 38 with a vertical slot 43 formed therein. The hinge sleeves 44 includes two parallel tabs 45, 46 that fits into a slot 43 and welded to the inside surface of the vertical surface 42 to securely attach the hinge sleeve 44 to the end connector 32.

The two top rails 52, 56 are straight, elongated, L-shaped bars that extend between the two top ends of the two end connectors 32, 42. Each top rail 52, 56 includes a top flange 53, 57 and a vertical flange 54, 58, respectively. The vertical flanges 54, 58 are attached to the side flanges 36, 38 and 46, 48 on said end connectors 32, 42, respectively. The top flanges 53, 57 are aligned horizontally and even with the top edges of the end connectors 32, 42. As shown more clearly in FIG. 10, the ends of the top flanges 53, 57 are diagonally cut away to make them aligned with the outward converging side flanges 36, 38 and 46, 48 on the end connectors 32, 42, respectively. A continuous upper gap 60 is formed between the two top rails 52, 56 approximately the same width as the vertical channels 39, 49 formed on the two end connectors 32, 42, respectively.

The bottom rail 64 includes a flat bottom surface 65 and two upward extending side walls 66, 67. The opposite ends of the two side walls 66, 67 are attached to the lower ends of the two side flanges 36, 38 and 46, 48 formed on the two end connectors 32, 42, respectively. The bottom rail 64 is U-shaped in cross-section and forms a continuous, upward extending lower channel 66. During assembly, the bottom surface 65 is placed horizontally and rests directly against the soil 200.

Extending between the two top rails 52, 56 and the bottom rail 64 is at least one intermediate vertical support 70 that supports and keeps the two top rails 52, 56 and bottom rail 64 parallel and evenly spaced apart. In one embodiment, the intermediate vertical support 70 is a z-shaped structural member with a front flange 72, a center flange 74, and a rear flange 76. The upper end of the center flange 74 extends into the upper gap 60 formed between the two top rails 52, 56 and the lower end extends into the lower channel 66 formed on the bottom rail 64. The front flange 72 and the rear flange 76 are aligned and attached to the inside surface of the vertical flanges 54, 58 on the top rails 52, 56. The center flange 74 is transversely aligned between the two top rails 52, 56, respectively.

The framing unit 20 is designed to be used with a plurality of vertical panels 90 with a uniform thickness that allows them to slide into the upper gap 60 formed between the two top rails 52, 56. The lower edges 91 of the vertical panels 90 are substantially straight and flat and designed to rest inside the lower channel 66 formed on the bottom rail 64. The top edges 92 of the vertical panels 90 extend into the upper gap 60. The outside laterally edges 93 of the two end panels 90 rest inside the two vertical channels 39, 49 formed on the two end connectors 32, 42 respectively.

When placed into the frame unit 20, the vertical panels 90 form a continuous vertical wall between the two end connectors 32, 42. The vertical panel's front or rear surfaces 96, 98 may be smooth or rough. Also, the height of the vertical panels 90 must extend into the upper gap 60 formed between the two top rails 52, 56. Sometimes, the vertical panels 90 may terminate at the top flanges 53, 57 on the two rails 52, 56 or may extend above the top flanges 53, 57. When the vertical panels 90 terminate near or at the top edge of the top rails 52, 62, an option cap rail 110 may be attached over the two top rails 52, 56 to provide a decorative edge.

The framing unit 20 is sold and distributed as a pre-assembled, single structure and may be manufactured in different lengths and heights depending on the size and shape of the enclosure or wall segment to be constructed. The framing unit 20 may also be manufactured with different upper gaps 60 gaps and channels widths to accommodate different thicknesses of vertical panels 90.

Typically, the type of project (i.e. raised planting bed, single wall segment or multiple wall segments) is determined. The desired height and length of enclosure or wall segments and the type of vertical panels are determined. Next, the number of vertical panels 90 is determined for each framing unit to form a continuous wall segment. The framing units 20, 20' are then vertically assembled in the desired location. The hinge sleeves 34, 44 on adjacent end connectors 32, 42' are aligned and anchor pins 88 are then inserted to the hinge sleeves 34, 44' to connect the end connectors 20, 20' together. The adjacent frame units 20, 20' may be longitudinally aligned to form a straight wall segment or rotated to form the corner on an enclosure or an angled wall segment.

The framing unit 20 is 48 to 120 inches in length, 12 to 36 inches in height and 4 to 8 inches in width. The upper gap 60, the two vertical channels 39, 49, and the lower channel 66 are approximately ½ to 3 inches wide.

In one embodiment shown in FIGS. 1, the vertical panels 90 may be made of vertically aligned, short pieces of standard size lumber (2×4), (2×6), (2×8) that can be easily replaced. In another embodiment shown in FIGS. 2, 4, 5, and 6, the panels 90 are made of square or rectangular pieces of concrete approximately 1½ inches thick.

In compliance with the statute, the invention described has been described in language more or less specific as to structural features. It should be understood however, that the invention is not limited to the specific features shown, since the means and construction shown, comprises the preferred embodiments for putting the invention into effect. The invention is therefore claimed in its forms or modifications within the legitimate and valid scope of the amended claims, appropriately interpreted under the doctrine of equivalents.

I claim:

1. A landscape framing unit, comprising:
   a. two parallel end connectors each with a longitudinal axis, a midline axis and two side flanges, said side flanges of each end connector being joined together at one end and then separate to form a vertical channel inside each respective end connector, at least one hinge sleeve attached to said side flanges of each end connector, and extending outward and aligned parallel to said longitudinal axis of each respective end connector, said side flanges of each end connector configured such that said hinge sleeves on opposite ends of the framing unit are offset with respect to one another so that when end connectors on adjacent framing units are aligned parallel and abutted, said hinge sleeves on said end connectors on adjacent framing units may be stacked and coaxially aligned and said framing units may be rotated over coaxially aligned hinge sleeves in a 300 degree arc;
   b. an elongated, straight U-shaped bottom rail perpendicularly aligned and connected at opposite ends to respective side flanges of said end connectors, said bottom rail includes a lower channel;
   c. two elongated, straight L-shaped top rails perpendicularly aligned and connected at opposite ends of each top rail to respective side flanges of said end connectors, each said top rail includes a horizontal top flange and a vertical flange, said top rails being parallel to said bottom rail and spaced apart thereby forming an upper gap, said upper gap, said vertical channels, and said lower channel each comprising a width approximately equal to one another;
   d. at least one vertical support member extending between said bottom rail and said top rails, said at least one vertical support member configured to hold said bottom rail and said top rails distant apart; and,
   e. two anchor pins each configured to be inserted into one of said at least one hinge sleeve on each said end connector to hold said framing unit in a vertical alignment over a support surface.

2. The landscape framing unit as recited in claim 1, wherein said at least one vertical support member is an elongated z-shaped plate.

3. The landscape framing unit as recited in claim 1, further comprising an elongated top cap configured to be selectively attached over said two top rails.

4. The landscape framing unit as recited in claim 1, further including a plurality of panels configured to fit through said upper gap formed by said top rails and into said lower channel formed on said bottom rail and extend between said top rails.

5. The landscape framing unit as recited in claim 4, wherein said at least one vertical support member is an elongated z-shaped plate.

6. The landscape framing unit as recited in claim 4, further comprising an elongated top cap configured to be selectively attached over said two top rails.

7. The landscape framing unit, as recited in claim 4, wherein said panels are made of concrete.

8. The landscape framing unit, as recited in claim 4, wherein said panels are made of wood.

9. The landscape framing unit, as recited in claim 1, wherein said end connectors, said bottom rail and said top rails are made of galvanized steel.

10. The landscape framing unit as recited in claim 1, wherein said framing unit is approximately 48 inches in length, 12 inches in height, and 2 inches in width, said upper gap and said vertical channels and said lower channel are approximate 1-⅞ inches in width.

11. A method for assembling an elongated retaining wall or a raised planting bed on a support surface, comprising the following steps:
   a. selecting at least two framing units to form an elongated retaining wall or a raised planting bed, each of said framing units includes:
      two parallel end connectors each with a longitudinal axis and at least one laterally extending hinge sleeve aligned parallel to said longitudinal axis, said at least one hinge sleeve of one end connector being offset from said at least one hinge sleeve of the other end connector thereby enabling the ends on adjacent said framing units to be abutted and enabling said adjacent framing units to be connected together and rotated around coaxially aligned hinge sleeves in a 300 degree arc to form a straight or angled elongated retaining wall or a raised planting bed;
      an elongated, straight, u-shaped bottom rail perpendicularly aligned and connected at opposite ends to said end connectors, said bottom rail includes a lower channel;
      two elongated, straight, L-shaped top rails perpendicularly aligned and connected at opposite ends of each top rail to said end connectors, said top rails being parallel to said bottom rail, said top rails being spaced apart to form an upper gap with a gap width approximately equal to the width of said lower channel formed on said bottom rail;
      at least one vertical support member extending between said bottom rail and said top rails configured to hold sections of said bottom rail and said top rails apart from one another, where said sections are distant from said end connectors; and,
b. assembling said framing units vertically in an end to end manner over said support surface to form said elongated retaining wall or said raised planting bed, adjacent said framing units being interconnected by abutting the end connectors at one end and coaxially aligning said hinge sleeves of the abutting end connectors and inserting an anchor pin through said hinge sleeves of the abutting end connectors, when abutted and connected together said framing units may be rotated up to a 300 degree arc;
c. selecting a plurality of panels configured to extend between said top rails and said bottom rail, said panels configured to slide through said upper gap formed by said top rails and rest inside said lower channel formed on said bottom rail, said panels include side edges configured to abut to form a continuous wall between said end connectors;
d. inserting said panels through said upper gap formed by said top rails and into said lower channel formed on said bottom rail and abutting said side edges of said vertical panels to form a continuous wall between said end connectors; and,
e. depositing soil on one side of said panels to form said retaining wall or said raised planting bed.

* * * * *